US008431257B2

(12) United States Patent
Kim et al.

(10) Patent No.: US 8,431,257 B2
(45) Date of Patent: Apr. 30, 2013

(54) PERPENDICULAR MAGNETIC RECORDING MEDIUM

(75) Inventors: Kong Kim, Tokyo (JP); Hi Shin, Tokyo (JP); Tomoko Seki, Tokyo (JP); Satoshi Ishii, Tokyo (JP)

(73) Assignee: WD Media (Singapore) PTE. Ltd., Singapore (SG)

( * ) Notice: Subject to any disclaimer, the term of this patent is extended or adjusted under 35 U.S.C. 154(b) by 234 days.

(21) Appl. No.: 12/749,147

(22) Filed: Mar. 29, 2010

(65) Prior Publication Data

US 2010/0247963 A1 Sep. 30, 2010

(30) Foreign Application Priority Data

Mar. 30, 2009 (JP) .................................. 2009-081885
Mar. 24, 2010 (JP) .................................. 2010-067388

(51) Int. Cl.
*G11B 5/66* (2006.01)
(52) U.S. Cl.
USPC ...................................... 428/829; 428/836.2
(58) Field of Classification Search .................. None
See application file for complete search history.

(56) References Cited

U.S. PATENT DOCUMENTS

| 6,174,597 B1 * | 1/2001 | Yusu et al. ..................... 428/332 |
| 7,465,501 B1 * | 12/2008 | Lee et al. ..................... 428/829 |
| 2006/0024432 A1 | 2/2006 | Nolan et al. |
| 2006/0204791 A1 * | 9/2006 | Sakawaki et al. .......... 428/828.1 |
| 2006/0246323 A1 | 11/2006 | Liu et al. |
| 2007/0223142 A1 * | 9/2007 | Takekuma et al. ............ 360/131 |
| 2008/0062575 A1 | 3/2008 | Shimizu |

FOREIGN PATENT DOCUMENTS

| EP | 0275455 | 7/1988 |
| JP | 2003-036525 A | 2/2003 |
| JP | 2006-286106 A | 10/2006 |
| JP | 2006-351055 A | 12/2006 |

OTHER PUBLICATIONS

Oikawa, et al., "Microstructure and Magnetic Properties of CoPtCr-SiO2 Perpendicular Recording Media", IEEE Transactions on Magnetics, vol. 38, No. 5, Sep. 2002, pp. 1976-1978.
Written Opinion and Search Report dated Mar. 17, 2011 from Singapore Patent Application No. 201002200-2, 18 pages.

* cited by examiner

*Primary Examiner* — Kevin Bernatz

(57) ABSTRACT

A perpendicular magnetic recording medium is used for information recording of a perpendicular magnetic recording type. The perpendicular magnetic recording medium includes a substrate, a soft magnetic layer, an underlayer, and a magnetic layer having a multilayered structure including a plurality of magnetic layers. The soft magnetic layer, the underlayer, and the magnetic layer are formed on the substrate. At least one of the magnetic layers includes CoPt magnetic grains containing oxide. The oxide includes at least one material selected from the group consisting of $SiO_2$, $TiO_2$, $Cr_2O_3$, $Ta_2O_5$, $WO_3$, CoO, and $Co_3O_4$.

2 Claims, 4 Drawing Sheets

| | Material of 1st Magnetic Layer |
|---|---|
| Comparative Example 1 | CoCrPt-Cr2O3-SiO2 (Co: 65at%, Cr: 11at%, Pt: 17at%, Cr2O3: 3.5at%, SiO2: 3.5at%) |
| Comparative Example 2 | CoCrPt-Cr2O3-SiO2 (Co: 65at%, Cr: 11at%, Pt: 17at%, Cr2O3: 3.5at%, SiO2: 3.5at%) |
| Example 1 | CoCrPt-SiO2-Cr2O3 (Co: 65at%, Cr: 11at%, Pt: 17at%, SiO2: 3.5at%, Cr2O3: 3.5at%) |
| Example 2 | CoCrPt-SiO2-Cr2O3 (Co: 65at%, Cr: 11at%, Pt: 17at%, SiO2: 3.5at%, Cr2O3: 3.5at%) |
| Example 3 | CoCrPt-SiO2-Cr2O3 (Co: 65at%, Cr: 11at%, Pt: 17at%, SiO2: 3.5at%, Cr2O3: 3.5at%) |
| Example 4 | CoCrPt-SiO2-Cr2O3 (Co: 65at%, Cr: 11at%, Pt: 17at%, SiO2: 3.5at%, Cr2O3: 3.5at%) |
| Example 5 | CoCrPt-SiO2-Cr2O3 (Co: 65at%, Cr: 11at%, Pt: 17at%, SiO2: 3.5at%, Cr2O3: 3.5at%) |
| Example 6 | CoCrPt-SiO2-Cr2O3 (Co: 65at%, Cr: 11at%, Pt: 17at%, SiO2: 3.5at%, Cr2O3: 3.5at%) |
| Example 7 | CoPt-TiO2 (Co: 69at%, Pt: 19at%, TiO2: 12at%) |
| Example 8 | CoPt-TiO2-SiO2 (Co: 69at%, Pt: 19at%, TiO2: 9at%, SiO2: 3at%) |
| Example 9 | CoPt-TiO2-SiO2-Co3O4 (Co: 69at%, Pt: 19at%, TiO2: 8at%, SiO2: 3at%, Co3O4: 1at%) |
| Example 10 | CoCrPt-SiO2-Cr2O3 (Co: 65at%, Cr: 11at%, Pt: 17at%, SiO2: 3.5at%, Cr2O3: 3.5at%) |
| Example 11 | CoCrPt-SiO2-Cr2O3 (Co: 65at%, Cr: 11at%, Pt: 17at%, SiO2: 3.5at%, Cr2O3: 3.5at%) |
| Example 12 | CoCrPt-SiO2-Cr2O3 (Co: 65at%, Cr: 11at%, Pt: 17at%, SiO2: 3.5at%, Cr2O3: 3.5at%) |
| Example 13 | CoCrPt-SiO2-Cr2O3 (Co: 65at%, Cr: 11at%, Pt: 17at%, SiO2: 3.5at%, Cr2O3: 3.5at%) |
| Example 14 | CoCrPt-SiO2-Cr2O3 (Co: 65at%, Cr: 11at%, Pt: 17at%, SiO2: 3.5at%, Cr2O3: 3.5at%) |
| Example 15 | CoCrPt-SiO2-Cr2O3 (Co: 65at%, Cr: 11at%, Pt: 17at%, SiO2: 3.5at%, Cr2O3: 3.5at%) |
| Example 16 | CoCrPt-SiO2-Cr2O3 (Co: 65at%, Cr: 11at%, Pt: 17at%, SiO2: 3.5at%, Cr2O3: 3.5at%) |
| Example 17 | CoCrPt-SiO2-Cr2O3 (Co: 65at%, Cr: 11at%, Pt: 17at%, SiO2: 3.5at%, Cr2O3: 3.5at%) |
| Example 18 | CoCrPt-Cr2O3 (Co: 65at%, Cr: 11at%, Pt: 17at%, Cr2O3: 7at%) |
| Example 19 | CoCrPt-Cr2O3 (Co: 67at%, Cr: 11at%, Pt: 17at%, Cr2O3: 5at%) |
| Example 20 | CoCrPt-Cr2O3-SiO2 (Co: 67at%, Cr: 11at%, Pt: 17at%, Cr2O3: 2.5at%, SiO2: 2.5at%) |
| Example 21 | CoCrPt-TiO2-SiO2-Co3O4 (Co: 69at%, Cr: 7at%, Pt: 14at%, TiO2: 4.5at%, SiO2: 4.5at%, Co3O4: 1at%) |
| Example 22 | CoCrPt-TiO2-SiO2-Co3O4 (Co: 63at%, Cr: 13at%, Pt: 14at%, TiO2: 4.5at%, SiO2: 4.5at%, Co3O4: 1at%) |
| Example 23 | CoCrPt-SiO2-Cr2O3 (Co: 65at%, Cr: 11at%, Pt: 17at%, SiO2: 3.5at%, Cr2O3: 3.5at%) |
| Example 24 | CoCrPt-SiO2-Cr2O3 (Co: 65at%, Cr: 11at%, Pt: 17at%, SiO2: 3.5at%, Cr2O3: 3.5at%) |
| Example 25 | CoPt-TiO2 (Co: 69at%, Pt: 19at%, TiO2: 12at%) |
| Example 26 | CoPt-TiO2-SiO2 (Co: 69at%, Pt: 19at%, TiO2: 9at%, SiO2: 3at%) |

FIG. 2A

| | Material of 2nd Magnetic Layer |
|---|---|
| Comparative Example 1 | CoCrPt-TiO2 (Co: 62at%, Cr: 7at%, Pt: 19at%, TiO2: 12at%) |
| Comparative Example 2 | CoCrPt-TiO2 (Co: 66at%, Cr: 3at%, Pt: 19at%, TiO2: 12at%) |
| Example 1 | CoPt-TiO2 (Co: 69at%, Pt: 19at%, TiO2: 12at%) |
| Example 2 | CoPt-TiO2 (Co: 72at%, Pt: 19at%, TiO2: 9at%) |
| Example 3 | CoPt-TiO2 (Co: 71at%, Pt: 19at%, TiO2: 10at%) |
| Example 4 | CoPt-TiO2 (Co: 70at%, Pt: 19at%, TiO2: 11at%) |
| Example 5 | CoPt-TiO2 (Co: 68at%, Pt: 19at%, TiO2: 13at%) |
| Example 6 | CoPt-TiO2 (Co: 67at%, Pt: 19at%, TiO2: 14at%) |
| Example 7 | CoCrPt-TiO2-SiO2-Co3O4 (Co: 64at%, Cr: 9at%, Pt: 16at%, TiO2: 5at%, SiO2: 5at%, Co3O4: 1at%) |
| Example 8 | CoCrPt-TiO2-SiO2-Co3O4 (Co: 64at%, Cr: 9at%, Pt: 16at%, TiO2: 5at%, SiO2: 5at%, Co3O4: 1at%) |
| Example 9 | CoPt-TiO2-SiO2-Co3O4 (Co: 64at%, Cr: 9at%, Pt: 16at%, TiO2: 5at%, SiO2: 5at%, Co3O4: 1at%) |
| Example 10 | CoPt-TiO2 (Co: 70at%, Pt: 17at%, TiO2: 13at%) |
| Example 11 | CoPt-TiO2 (Co: 65at%, Pt: 22at%, TiO2: 13at%) |
| Example 12 | CoPt-SiO2 (Co: 69at%, Pt: 19at%, SiO2: 12at%) |
| Example 13 | CoPt-Cr2O3 (Co: 74at%, Pt: 19at%, Cr2O3: 7at%) |
| Example 14 | CoPt-Ta2O5 (Co: 76at%, Pt: 19at%, Ta2O5: 5at%) |
| Example 15 | CoPt-WO3 (Co: 76at%, Pt: 19at%, WO3: 5at%) |
| Example 16 | CoPt-CoO (Co: 75at%, Pt: 19at%, CoO: 6at%) |
| Example 17 | CoPt-Co3O4 (Co: 75at%, Pt: 19at%, Co3O4: 6at%) |
| Example 18 | CoPt-TiO2 (Co: 69at%, Pt: 19at%, TiO2: 12at%) |
| Example 19 | CoPt-TiO2 (Co: 69at%, Pt: 19at%, TiO2: 12at%) |
| Example 20 | CoPt-TiO2 (Co: 69at%, Pt: 19at%, TiO2: 12at%) |
| Example 21 | CoPt-TiO2 (Co: 69at%, Pt: 19at%, TiO2: 12at%) |
| Example 22 | CoPt-TiO2 (Co: 69at%, Pt: 19at%, TiO2: 12at%) |
| Example 23 | CoPt-TiO2-SiO2 (Co: 69at%, Pt: 19at%, TiO2: 8at%, SiO2: 4at%) |
| Example 24 | CoPt-TiO2-SiO2-Co3O4 (Co: 69at%, Pt: 19at%, TiO2: 8at%, SiO2: 3at%, Co3O4: 1at%) |
| Example 25 | CoPt-TiO2 (Co: 69at%, Pt: 19at%, TiO2: 12at%) |
| Example 26 | CoPt-TiO2 (Co: 69at%, Pt: 19at%, TiO2: 12at%) |

FIG. 2B

| | Ms [emu/cc] | Ku [erg/cc] | Hc [Oe] | vKu/kT | S/N [dB] |
|---|---|---|---|---|---|
| Comparative Example 1 | 540 | $4.5 \times 10^6$ | 4600 | 80 | 17.4 |
| Comparative Example 2 | 580 | $4.8 \times 10^6$ | 4850 | 90 | 17.6 |
| Example 1 | 660 | $5.7 \times 10^6$ | 5400 | 150 | 18.4 |
| Example 2 | 700 | $5.2 \times 10^6$ | 5100 | 120 | 18.0 |
| Example 3 | 690 | $5.3 \times 10^6$ | 5200 | 125 | 18.1 |
| Example 4 | 680 | $5.5 \times 10^6$ | 5300 | 130 | 18.0 |
| Example 5 | 650 | $5.8 \times 10^6$ | 5500 | 160 | 18.2 |
| Example 6 | 630 | $5.1 \times 10^6$ | 5050 | 110 | 18.1 |
| Example 7 | 500 | $4.0 \times 10^6$ | 5300 | 125 | 18.1 |
| Example 8 | 500 | $4.0 \times 10^6$ | 5250 | 120 | 18.2 |
| Example 9 | 500 | $4.0 \times 10^6$ | 5250 | 115 | 18.3 |
| Example 10 | 660 | $5.1 \times 10^6$ | 5050 | 115 | 18.5 |
| Example 11 | 640 | $5.8 \times 10^6$ | 5350 | 135 | 18.2 |
| Example 12 | 580 | $5.7 \times 10^6$ | 5050 | 110 | 18.0 |
| Example 13 | 660 | $5.5 \times 10^6$ | 5200 | 125 | 18.2 |
| Example 14 | 650 | $5.3 \times 10^6$ | 5350 | 135 | 18.3 |
| Example 15 | 640 | $5.2 \times 10^6$ | 5250 | 125 | 18.3 |
| Example 16 | 680 | $5.0 \times 10^6$ | 5150 | 120 | 18.0 |
| Example 17 | 700 | $4.9 \times 10^6$ | 5050 | 110 | 18.0 |
| Example 18 | 660 | $5.7 \times 10^6$ | 5100 | 115 | 18.5 |
| Example 19 | 660 | $5.7 \times 10^6$ | 5300 | 130 | 18.4 |
| Example 20 | 660 | $5.7 \times 10^6$ | 5550 | 150 | 18.3 |
| Example 21 | 660 | $5.7 \times 10^6$ | 5600 | 160 | 18.4 |
| Example 22 | 660 | $5.7 \times 10^6$ | 5300 | 130 | 18.6 |
| Example 23 | 660 | $5.7 \times 10^6$ | 5450 | 150 | 18.6 |
| Example 24 | 670 | $5.7 \times 10^6$ | 5500 | 150 | 18.8 |
| Example 25 | 660 | $4.8 \times 10^6$ | 4900 | 100 | 17.8 |
| Example 26 | 660 | $4.8 \times 10^6$ | 4950 | 100 | 17.8 |

FIG. 2C

PERPENDICULAR MAGNETIC RECORDING MEDIUM

This application is based upon and claims the benefit of priority from Japanese Patent Application No. 2009-081885, filed on Mar. 30, 2009, and Japanese Patent Application 2010-067388, filed on Mar. 24, 2010, the disclosures of which are incorporated herein in their entirety by reference.

TECHNICAL FIELD

The present invention relates to a perpendicular magnetic recording medium mounted on a magnetic disk device such as a perpendicular magnetic recording type hard disk drive (HDD).

BACKGROUND ART

Various information recording techniques have been developed along with recent increase of capacity in information processing. Particularly, the areal recording density of hard disk drives (HDDs) using a magnetic recording technique has continued to increase at an annual rate of about 100%. Recently, a 2.5-inch magnetic disk used for an HDD or the like has been required to have an information storage capacity greater than 250 Gbytes per disk. In order to meet such a demand, it is necessary to achieve an information recording density greater than 400 Gbits/inch$^2$. In order to achieve a high recording density of a magnetic disk used for an HDD or the like, it is necessary to reduce the size of magnetic crystal grains that constitute a magnetic recording layer, which is used to record informational signals, and to reduce the thickness of the magnetic recording layer. As a result of development in reduction of the size of magnetic crystal grains, however, the thermal stability of recorded signals is deteriorated due to the superparamagnetism phenomenon in an in-plane magnetic recording type magnetic disk, which has heretofore been commercialized. Therefore, the recorded signals are lost, and a thermal fluctuation phenomenon occurs. Those problems inhibit an increase of the recording density of a magnetic disk. The in-plane magnetic recording type is also referred to as a longitudinal magnetic recording type or a horizontal magnetic recording type.

In order to eliminate those inhibitors, a perpendicular magnetic recording type magnetic disk has been proposed in recent years. Unlike an in-plane magnetic recording type magnetic disk, a perpendicular magnetic recording type magnetic disk has a principal recording layer with an easy axis oriented perpendicular to a surface of a substrate. The perpendicular magnetic recording type can reduce a thermal fluctuation phenomenon as compared to the in-plane magnetic recording type because a recording layer can have a large film thickness. Furthermore, the perpendicular magnetic recording medium has a soft magnetic layer. A magnetic flux from a recording head can converge with the soft magnetic layer. Additionally, a magnetic field larger and steeper than that of a longitudinal magnetic recording type can be generated by the mirror image effect. Accordingly, the perpendicular magnetic recording type is suitable to increase the recording density.

If a magnetic recording layer of the perpendicular magnetic recording type has a hexagonal close-packed (hcp) structure, the c-axis becomes an easy axis. Thus, the c-axis should be oriented in the normal direction of a substrate. In order to improve the orientation of the c-axis, it is effective to provide a nonmagnetic underlayer having an hcp structure underneath the magnetic recording layer. It has been known that such an underlayer can employ CoCr alloy, Ti, V, Zr, Hf, and the like. Among other things, it has been known that ruthenium (Ru) can effectively improve the crystal orientation of a magnetic recording layer and can increase the magnetic coercive force (Hc).

In order to improve the signal-to-noise ratio (S/N ratio) of a perpendicular magnetic recording type medium, magnetic grains of a magnetic recording layer are isolated and reduced in size by forming a granular structure in which nonmagnetic substance (e.g., chromium) or oxide is segregated between the magnetic grains so as to form grain boundaries (see, e.g., JP-A-2003-36525). Furthermore, a magnetic layer is multilayered in order to promote segregation of the nonmagnetic substance or oxide at the grain boundaries and to promote reduction of the size of the magnetic grains (see, e.g., JP-A-2006286106).

Meanwhile, there has been demanded to further increase the information recording density of a magnetic disk. Recently, a 2.5-inch magnetic disk used for an HDD or the like has been required to have an information storage capacity greater than 250 Gbytes per disk. In order to meet such a demand, it is necessary to achieve an information recording density greater than 400 Gbits/inch$^2$, In order to achieve a high recording density of a magnetic disk used for an HDD or the like, it is necessary to reduce the size of magnetic grains and to improve the S/N ratio. In a perpendicular magnetic recording medium with conventional configuration, while a magnetic layer is multilayered, a large amount of nonmagnetic substance (e.g., chromium) is added to reduce the saturation magnetization (Ms) for thereby reducing noise. See, JPA-2006-351055. With this method, the crystal magnetic anisotropy (Ku) of the magnetic layer is lowered so that the magnetic energy of the magnetic layer becomes unable to overcome the demagnetizing field and the thermal energy. Therefore, a thermal fluctuation phenomenon becomes problematic. Additionally, with this configuration, the film thickness of the magnetic layer should be increased in order to output signals. Therefore, an extra material is needed to produce a medium, resulting in an increase of material cost.

SUMMARY OF THE INVENTION

It is, therefore, an exemplary object of the present invention to provide a perpendicular magnetic recording medium capable of improving signal outputs of electromagnetic characteristics and magnetic characteristics without reduction of Ms and Ku of a magnetic layer.

The inventors have diligently studied the solution of the above problems. The inventors have attracted attention to a magnetic layer as part of a recording layer in a currently available magnetic recording medium (e.g., an upper magnetic layer or a lower magnetic layer in a case where a recording layer includes two magnetic layers). The inventors have considered eliminating chromium components, which have heretofore been added as nonmagnetic substance, from a magnetic layer such that only oxide is used for segregation at grain boundaries. For this purpose, the inventors examined magnetic characteristics and electromagnetic characteristics when materials having various values of Ms and Ku were used in a currently available magnetic layer. As a result, the inventors have found that CoPt magnetic grains containing oxide are optimum materials. Thus, the inventors have completed the present invention.

According to an exemplary aspect of the present invention, there is provided a perpendicular magnetic recording medium used for information recording of a perpendicular magnetic recording type, the perpendicular magnetic recording medium comprising a substrate, a soft magnetic layer, an underlayer formed, and a magnetic layer having a multilayered structure including a plurality of magnetic layers, at least one of the magnetic layers including CoPt magnetic grains containing oxide, the soft magnetic layer, the underlayer, and the magnetic layer being formed on the substrate.

BRIEF DESCRIPTION OF THE DRAWINGS

FIGS. 2A and 2B are tables showing materials of a first magnetic layer and a second magnetic layer in perpendicular magnetic recording media of Examples 1-24 and Comparative Examples 1-2; and FIG. 2C is a table showing evaluation results of Examples 1-24 and Comparative Examples 1-2.

DESCRIPTION OF THE EMBODIMENT

Figure 1:
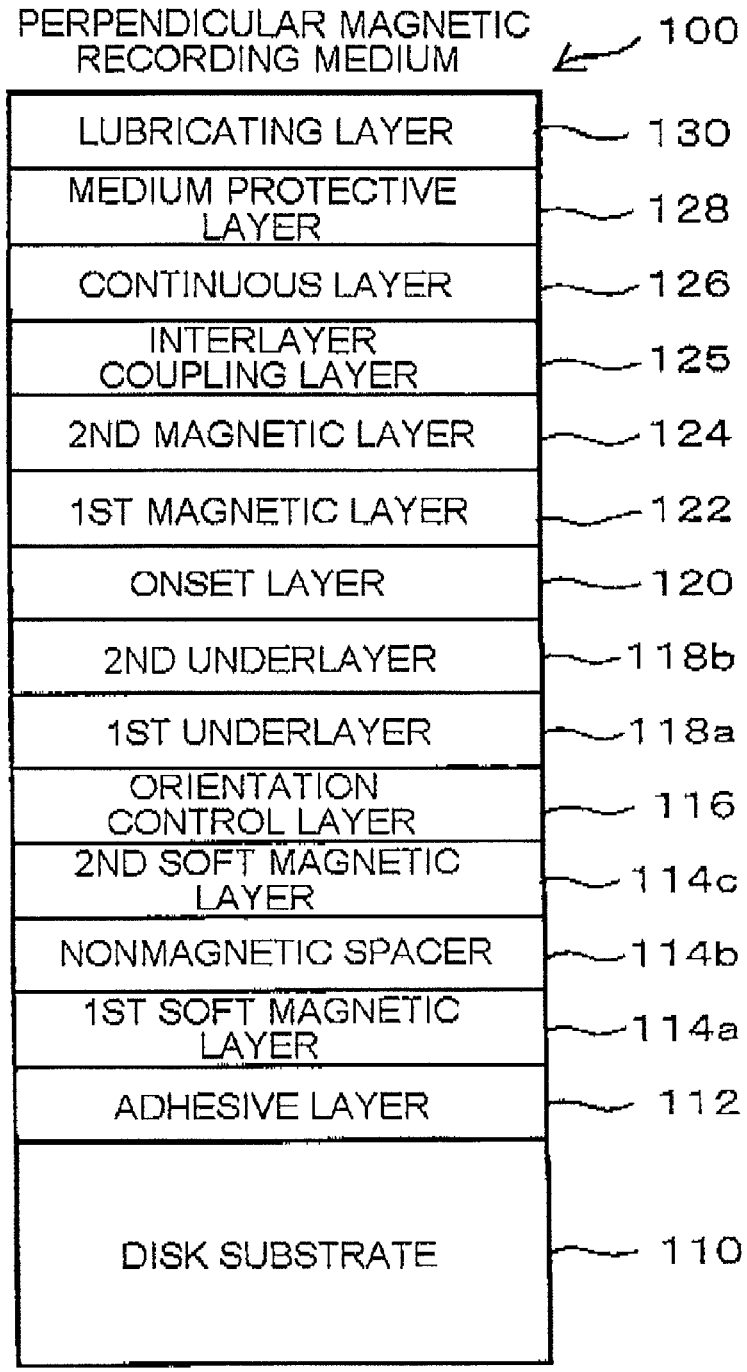
FIG. 1 is a diagram showing a layered structure of a perpendicular magnetic recording medium according to an embodiment of the present invention.

An embodiment of the present invention will be described in detail below.

FIG. 1 is a cross-sectional view showing a layered structure of a perpendicular magnetic recording medium 100 according to an embodiment of the present invention. The perpendicular magnetic recording medium 100 can include a substrate (disk substrate) 110, an adhesive layer 112, a soft magnetic layer 114, an orientation control layer 116, an underlayer 118, an onset layer 120, a first magnetic layer 122, a second magnetic layer 124, an interlayer coupling layer 125, a continuous layer 126, a medium protective layer 128, and a lubricating layer 130.

First, amorphous aluminosilicate glass is formed into a circular plate by direct pressing, thereby producing a glass disk. Grinding, polishing, and chemical strengthening are sequentially carried out on the glass disk to thereby produce a smooth nonmagnetic glass substrate 110 of a chemically strengthened glass disk, which is hereinafter referred to as a disk substrate. Aluminosilicate glass can stably reduce magnetic spacing, particularly a flying height of a magnetic head because it provides smoothness and high stiffness. For example, the diameter of the disk is 65 mm in a case of a 2.5-inch disk. It is preferable for the glass substrate to have a smooth surface such that Rmax is 3 nm or less and Ra is 0.2 nm or less when the surface roughness of a primary surface of the disk substrate 110 is measured with an atomic force microscope (AFM), Here, Rmax and Ra conform to Japanese Industrial Standards (JIS).

Layers from the adhesive layer 112 to the continuous layer 126 are deposited on the disk substrate 110 under an Ar gas atmosphere by a DC magnetron sputtering method using an evacuated deposition apparatus. The medium protective layer 128 is preferably formed by a CVD method. Then the lubricating layer 130 is formed by, for example, a dip coating method. It is preferable to use a single-substrate deposition method because layers can be deposited uniformly. A structure of each layer and a method of forming each layer will be described below. Materials described here are mere examples unless otherwise described. The present invention is not limited to those examples.

The adhesive layer 112 is deposited as a 10-nm Ti alloy layer by using a Ti alloy target. The adhesive layer 112 can improve adhesiveness between the disk substrate 110 and the soft magnetic layer 114. Therefore, the soft magnetic layer 114 is prevented from being peeled off. For example, a material containing Ti may be used for the adhesive layer 112. From the practical viewpoint, the film thickness of the adhesive layer 112 is preferably in a range of 1 nm to 50 nm.

The soft magnetic layer 114 includes a first soft magnetic layer 114a, a nonmagnetic spacer layer 114b, and a second soft magnetic layer 114c. The soft magnetic layer 114 is configured to have antiferro-magnetic exchange coupling (AFC) by providing the nonmagnetic spacer layer 114b between the first soft magnetic layer 114a and the second soft magnetic layer 114c. Thus, magnetization directions of the soft magnetic layer 114 can be arranged along a magnetic path (magnetic circuit) with high accuracy. Noise produced from the soft magnetic layer 114 can be reduced because vertical components of magnetization are extremely lessened. For example, the first soft magnetic layer 114a and the second soft magnetic layer 114c may be formed of FeCoTaZr. The nonmagnetic spacer layer 114b may include ruthenium (Ru) as nonmagnetic material.

The orientation control layer 116 has a function of protecting the soft magnetic layer 114, a function of promoting alignment of the orientation of crystal grains of the underlayer 118, and a function of reducing the size of the crystal grains. The orientation control layer 116 can be formed by using NiW having an fcc structure.

The underlayer 118 has a double layer structure of Ru, for example. The underlayer 118 includes a first constituent underlayer 118a on a lower side of the underlayer 118 and a second constituent underlayer 118b on an upper side of the underlayer 118. When the second underlayer 118b is to be formed, a gas pressure of Ar is reduced as compared to the gas pressure for forming the first underlayer 118a. With this configuration, crystal orientation can be improved.

The onset layer 120 has a function of reducing the size of magnetic crystal grains of the first magnetic layer 122. The onset layer 120 can be formed by using CoCrRu—$TiO_2$ having an hcp structure.

The first magnetic layer 122 is a magnetic granular layer for forming an initial layer of the second magnetic layer 124. For example, it is preferable to use (Co-12Cr-18Pt)-5$TiO_2$, (Co-12Cr-18Pt)-3.5$Cr_2O_3$-3.5$SiO_2$, or (Co-12Cr-18Pt)-4.5$TiO_2$-4.5$SiO_2$-1$Co_3O_4$ having an hcp crystal structure for the first magnetic layer 122.

In the present embodiment, the second magnetic layer 124 includes CoPt magnetic grains containing oxide. The inventors used materials having various values of Ms and Ku for the second magnetic layer and examined magnetic characteristics and electromagnetic characteristics of the second magnetic layer. As a result, the inventor have found that CoPt magnetic grains containing oxide is the most suitable material. An hcp crystal structure is formed by using a target made of a hard magnetic material of CoPt containing one or ones of silicon oxide ($SiO_2$), titanium oxide ($TiO_2$), chromium oxide ($Cr_2O_3$), tungsten oxide ($WO_3$), cobalt oxide (CoO), cobalt oxide ($Co_3O_4$), and tantalum oxide ($Ta_2O_5$), which are nonmagnetic substances. Those oxides are segregated around magnetic substance to form grain boundaries, so that magnetic grains form a granular structure having a columnar shape. Those magnetic grains epitaxially grow continuously from granular structures of the onset layer 120 and the first magnetic layer 122.

The inventors examined various types of CoPt magnetic grains containing oxide while varying the amount of Pt added, the kind of oxide, and the amount of oxide added. As a result, it is preferable to form the second magnetic layer 124 of at least one compound selected from the alloy group consisting of (Co-xPt)-13$TiO_2$ (x=20, 22, or 25), (Co-22Pt)-y$TiO_2$ (y=9, 10, 11, 12, 13, or 14), and (Co-22Pt)-12(oxide) (oxide=at least one material selected from $TiO_2$, $SiO_2$, $Cr_2O_3$, Ta$_2$O$_5$, WO$_3$, CoO, or Co$_3$O$_4$). The oxide content of the CoPt magnetic grains is preferably in a range of from 8 atomic % to 15 atomic %, more preferably from 9 atomic % to 14 atomic %.

The second magnetic layer 124 preferably has a film thickness of at least 1 nm, preferably at least 3 nm. If the film thickness of the second magnetic layer 124 is less than 1 nm, then only an initial layer is formed so that magnetic characteristics may be deteriorated. Therefore, the film thickness of the second magnetic layer 124 may appropriately be set, for example, in a range of 3 nm to 10 nm.

In the present embodiment, the second magnetic layer as an upper layer includes CoPt magnetic grains containing oxide. The present invention is not limited to this example. The first magnetic layer may include CoPt magnetic grains containing oxide. Furthermore, in a case of a magnetic layer having multilayered structure of three or more layers, at least one magnetic layer includes CoPt magnetic grains containing oxide. The other layers preferably include CoCrPt containing oxide or CoCr magnetic grains containing oxide.

The interlayer coupling layer 125 serves to control magnetic coupling between the second magnetic layer 124 and the continuous layer 126 by using, for example, (Co-30Cr)-12TiO$_2$ or (Co-30Cr)-12SiO$_2$.

For example, the continuous layer 126 is formed of a CoCrPtB film by using a low Ar gas. Continuous magnetism is formed along a direction of a surface of the continuous layer 126. The film thickness of the continuous layer 126 is preferably equal to or less than 10 nm, more preferably equal to or less than 5 nm.

It is preferable to deposit carbon under vacuum by a CVD method so as to form the medium protective layer 128. The medium protective layer 128 is a protective layer for protecting the second magnetic layer 126 against impact from a magnetic head. Generally, carbon deposited by a CVD method is improved in film hardness as compared to carbon deposited by a sputtering method. Therefore, the medium protective layer 128 can protect the second magnetic layer 126 more effectively against impact from a magnetic head.

The lubricating layer 130 can be formed of perfluoropolyether (PFPE) by a dip coating method. The lubricating layer 130 has a film thickness of about 1 nm. Perfluoropolyether has a linear chain structure and can exhibit adequate lubrication characteristics for a magnetic disk. Perfluoropolyether can exhibit high adhesiveness to a carbon-based medium protective layer with its end group of a hydroxyl group (OH), The embodiment of the present invention will be described in greater detail with reference to specific examples and comparative examples.

EXAMPLE 1

Amorphous aluminosilicate glass was formed into a circular plate by direct pressing. Thus, a glass disk was produced. Grinding, polishing, and chemical strengthening were sequentially carried out on the glass disk to thereby produce a smooth nonmagnetic disk substrate of a chemically strengthened glass disk. The glass disk had a diameter of 65 mm, an inside diameter of 20 mm, and a disk thickness of 0.635 mm. The glass disk was formed as a substrate for a 2.5-inch magnetic disk. The surface roughness of the obtained glass substrate was measured with an atomic force microscope (AFM). The glass substrate had a smooth surface such that Rmax was 2.18 nm and Ra was 0.18 nm. Here, Rmax and Ra conform to Japanese Industrial Standards (JIS).

Next, an adhesive layer 112, a soft magnetic layer 114, an orientation control layer 116, an underlayer 118, an onset layer 120, a first magnetic layer 122, a second magnetic layer 124, an interlayer coupling layer 125, and a continuous layer 126 were sequentially deposited on the disk substrate 110 by a DC magnetron sputtering method using a C3040 sputtering deposition apparatus made by Cannon Anelva Corporation.

First, the adhesive layer 112 was formed as a 10-nm CrTi45 layer (Cr: 55 atomic %, Ti: 45 atomic %) by using a CrTi target.

Then the soft magnetic layers 114a and 114c were formed as a 20-nm amorphous FeCoTaZr layer (Fe: 37 atomic %, Co: 55 atomic %, Ta: 3 atomic %, Zr: 5 atomic %) by using a FeCoTaZr target. The nonmagnetic spacer layer 114b was formed as a 0.5-nm Ru layer by using a Ru target.

Next, the orientation control layer 116 of NiW having a thickness of 6 nm (Ni: 95 atomic %, W: 5 atomic %), the constituent underlayers 118a and 118b of Ru each having a film thickness of 10 nm, the onset layer 120 of CoCrRu—TiO$_2$ having a thickness of 1.5 nm (Co: 52 atomic %, Cr: 27 atomic %, Ru: 9 atomic %, TiO$_2$: 12 atomic %), the first magnetic layer 122 of CoCrPt—SiO$_2$—Cr$_2$O$_3$ having a thickness of 5 nm (Co: 65 atomic %, Cr: 11 atomic %, Pt: 17atomic %, SiO$_2$: 3.5 atomic %, Cr$_2$O$_3$: 3.5 atomic %), the second magnetic layer 124 of CoPt—TiO$_2$, the interlayer coupling layer 125, and the continuous layer 126 were sequentially formed on the soft magnetic layer 114. A deposition gas pressure for the Ru layer of the constituent underlayer 118a was 1.5 Pa, whereas a deposition gas pressure for the Ru layer of the constituent underlayer 118b was 6.0 Pa.

The second magnetic layer 124 was formed with a thickness of 5 nm by using a target made of a hard magnetic material of CoPt—TiO$_2$ (Co: 69 atomic %, Pt: 19 atomic %, TiO$_2$: 12 atomic %) having an hcp crystal structure. The interlayer coupling layer 125 was formed with a thickness of 0.6 nm by using a target of Co-27Cr-12TiO$_2$ having an hcp crystal structure. Furthermore, the continuous layer 126 was formed with a thickness of 7.0 nm by using a target of CoCrPtB (Co: 66 atomic %, Cr: 18 atomic %, Pt: 11 atomic %, B: 5 atomic %).

Next, a medium protective layer 128 was formed of hydrogenated carbon on the continuous layer 126 by a CVD method. Since hydrogenated carbon can improve the film hardness, the medium protective layer 128 can protect a primary perpendicular recording layer against impact from a magnetic head.

Then a lubricating layer 130 was formed of perfluoropolyether (PFPE) by a dip coating method. The lubricating layer 130 had a film thickness of 1 nm.

Thus, a perpendicular magnetic recording medium of Example 1 was produced.

COMPARATIVE EXAMPLE 1

A perpendicular magnetic recording medium of Comparative Example 1 was produced with the same film arrangement as that of Example 1 except that the second magnetic layer 124 was formed of CoCrPt—TiO$_2$ (Co: 62 atomic %, Cr: 7 atomic %, Pt: 19 atomic %, TiO$_2$: 12 atomic %).

COMPARATIVE EXAMPLE 2

A perpendicular magnetic recording medium of Comparative Example 2 was produced with the same film arrangement as that of Example 1 except that the second magnetic layer 124 was formed of CoCrPt—TiO$_2$ (Co: 66 atomic %, Cr: 3 atomic %, Pt: 19 atomic %, TiO$_2$: 12 atomic %).

EXAMPLE 2

A perpendicular magnetic recording medium of Example 2 was produced with the same film arrangement as that of Example 1 except that the second magnetic layer 124 was formed of CoPt—TiO$_2$ (Co: 72 atomic %, Pt 19 atomic %, TiO$_2$: 9 atomic %).

EXAMPLE 3

A perpendicular magnetic recording medium of Example 3 was produced with the same film arrangement as that of Example 1 except that the second magnetic layer 124 was formed of CoPt—TiO$_2$ (Co: 71 atomic %, Pt: 19 atomic %, TiO$_2$: 10 atomic %).

EXAMPLE 4

A perpendicular magnetic recording medium of Example 4 was produced with the same film arrangement as that of Example 1 except that the second magnetic layer 124 was formed of CoPt—TiO$_2$ (Co: 70 atomic %, Pt: 19 atomic %, TiO$_2$: 11 atomic %).

EXAMPLE 5

A perpendicular magnetic recording medium of Example 5 was produced with the same film arrangement as that of Example 1 except that the second magnetic layer 124 was formed of CoPt—TiO$_2$ (Co: 68 atomic %, Pt: 19 atomic %, TiO$_2$: 13 atomic %).

EXAMPLE 6

A perpendicular magnetic recording medium of Example 6 was produced with the same film arrangement as that of Example 1 except that the second magnetic layer 124 was formed of CoPt—TiO$_2$ (Co: 67 atomic %, Pt: 19 atomic %, TiO$_2$: 14 atomic %).

EXAMPLE 7

A perpendicular magnetic recording medium of Example 7 was produced with the same film arrangement as that of Example 1 except that the first magnetic layer 122 was formed of CoPt—TiO$_2$ (Co: 69 atomic %, Pt: 19 atomic %, TiO$_2$: 12 atomic %) and the second magnetic layer 124 was formed of CoCrPt—TiO$_2$—SiO$_2$—Co$_3$O$_4$ (Co: 64 atomic %, Cr: 9 atomic %, Pt: 16 atomic %, TiO$_2$: 5 atomic %, SiO$_2$: 5 atomic %, Co$_3$O$_4$: 1 atomic %).

EXAMPLE 8

A perpendicular magnetic recording medium of Example 8 was produced with the same film arrangement as that of Example 1 except that the first magnetic layer 122 was formed of CoPt—TiO$_2$—SiO$_2$ (Co: 69 atomic %, Pt: 19 atomic %, TiO$_2$: 9 atomic %, SiO$_2$: 3 atomic %) and the second magnetic layer 124 was formed of CoCrPt—TiO$_2$—SiO$_2$—Co$_3$O$_4$ (Co: 64 atomic %, Cr: 9 atomic %, Pt: 16 atomic %, TiO$_2$: 5 atomic %, SiO$_2$: 5 atomic %, Co$_3$O$_4$: 1 atomic %).

EXAMPLE 9

A perpendicular magnetic recording medium of Example 9 was produced with the same film arrangement as that of Example 1 except that the first magnetic layer 122 was formed of CoPt—TiO$_2$—SiO$_2$—Co$_3$O$_4$ (Co: 69 atomic %, Pt: 19 atomic %, TiO$_2$: 8 atomic %, SiO$_2$: 3 atomic %, Co$_3$O$_4$: 1 atomic %) and the second magnetic layer 124 was formed of CoCrPt—TiO$_2$—SiO$_2$—Co$_3$O$_4$ (Co: 64 atomic %, Cr: 9 atomic %, Pt: 16 atomic %, TiO$_2$: 5 atomic %, SiO$_2$: 5 atomic %, Co$_3$O$_4$: 1 atomic %).

EXAMPLE 10

A perpendicular magnetic recording medium of Example 10 was produced with the same film arrangement as that of Example 1 except that the second magnetic layer 124 was formed of CoPt—TiO$_2$ (Co: 70 atomic %, Pt: 17 atomic %, TiO$_2$: 13 atomic %).

EXAMPLE 11

A perpendicular magnetic recording medium of Example 11 was produced with the same film arrangement as that of Example 1 except that the second magnetic layer 124 was formed of CoPt—TiO$_2$ (Co: 65 atomic %, Pt: 22 atomic %, TiO$_2$: 13 atomic %).

EXAMPLE 12

A perpendicular magnetic recording medium of Example 12 was produced with the same film arrangement as that of Example 1 except that the second magnetic layer 124 was formed of CoPt—SiO$_2$ (Co: 69 atomic %, Pt: 19 atomic %, SiO$_2$: 12 atomic %).

EXAMPLE 13

A perpendicular magnetic recording medium of Example 13 was produced with the same film arrangement as that of Example 1 except that the second magnetic layer 124 was formed of CoPt—Cr$_2$O$_3$ (Co: 74 atomic %, Pt: 19 atomic %, Cr$_2$O$_3$: 7 atomic %).

EXAMPLE 14

A perpendicular magnetic recording medium of Example 14 was produced with the same film arrangement as that of Example 1 except that the second magnetic layer 124 was formed of CoPt—Ta$_2$O$_5$ (Co: 76 atomic %, Pt: 19 atomic %, Ta$_2$O$_5$: 5 atomic %).

EXAMPLE 15

A perpendicular magnetic recording medium of Example 15 was produced with the same film arrangement as that of Example 1 except that the second magnetic layer 124 was formed of CoPt—WO$_3$ (Co: 76 atomic %, Pt: 19 atomic %, WO$_3$: 6 atomic %).

EXAMPLE 16

A perpendicular magnetic recording medium of Example 16 was produced with the same film arrangement as that of Example 1 except that the second magnetic layer 124 was formed of CoPt—CoO (Co: 75 atomic %, Pt: 19 atomic %, CoO: 6 atomic %).

EXAMPLE 17

A perpendicular magnetic recording medium of Example 17 was produced with the same film arrangement as that of Example 1 except that the second magnetic layer 124 was formed of CoPt—Co$_3$O$_4$ (Co: 75 atomic %, Pt: 19 atomic %, Co$_3$O$_4$: 6 atomic %).

EXAMPLE 18

A perpendicular magnetic recording medium of Example 18 was produced with the same film arrangement as that of Example 1 except that the first magnetic layer 122 was formed of CoCrPt—$Cr_2O_3$ (Co: 65 atomic %, Cr: 11 atomic %, Pt: 17 atomic %, $Cr_2O_3$: 7 atomic %).

EXAMPLE 19

A perpendicular magnetic recording medium of Example 19 was produced with the same film arrangement as that of Example 1 except that the first magnetic layer 122 was formed of CoCrPt—$Cr_2O_3$ (Co: 67 atomic %, Cr: 11 atomic %, Pt: 17 atomic %, $Cr_2O_3$: 5 atomic %).

EXAMPLE 20

A perpendicular magnetic recording medium of Example 20 was produced with the same film arrangement as that of Example 1 except that the first magnetic layer 122 was formed of CoCrPt—$Cr_2O_3$—$SiO_2$ (Co: 67 atomic %, Cr: 11 atomic %, Pt: 17 atomic %, $Cr_2O_3$: 2.5 atomic %, $SiO_2$: 2.5 atomic %).

EXAMPLE 21

A perpendicular magnetic recording medium of Example 21 was produced with the same film arrangement as that of Example 1 except that the first magnetic layer 122 was formed of CoCrPt—$TiO_2$—$SiO_2$—$Co_3O_4$ (Co: 69 atomic %, Cr: 7 atomic %, Pt: 14 atomic %, $TiO_2$: 4.5 atomic %, $SiO_2$: 4.5 atomic %, $Co_3O_4$: 1 atomic %).

EXAMPLE 22

A perpendicular magnetic recording medium of Example 22 was produced with the same film arrangement as that of Example 1 except that the first magnetic layer 122 was formed of CoCrPt—$TiO_2$—$SiO_2$—$Co_3O_4$ (Co: 63 atomic %, Cr: 13 atomic %, Pt: 14 atomic %, $TiO_2$: 4.5 atomic %, $SiO_2$: 4.5 atomic %, $Co_3O_4$: 1 atomic %).

EXAMPLE 23

A perpendicular magnetic recording medium of Example 23 was produced with the same film arrangement as that of Example 1 except that the second magnetic layer 124 was formed of CoPt—$TiO_2$—$SiO_2$ (Co: 69 atomic %, Pt: 19 atomic %, $TiO_2$: 8 atomic %, $SiO_2$: 4 atomic %).

EXAMPLE 24

A perpendicular magnetic recording medium of Example 24 was produced with the same film arrangement as that of Example 1 except that the second magnetic layer 124 was formed of CoPt—$TiO_2$—$SiO_2$—$Co_3O_4$ (Co: 69 atomic %, Pt: 19 atomic %, $TiO_2$: 8 atomic %, $SiO_2$: 3 atomic %, $Co_3O_4$: 1 atomic %).

EXAMPLE 25

A perpendicular magnetic recording medium of Example 25 was produced with the same film arrangement as that of Example 1 except that the first magnetic layer 122 was formed of CoPt—$TiO_2$ (Co: 69 atomic %, Pt: 19 atomic %, $TiO_2$: 12 atomic %).

EXAMPLE 26

A perpendicular magnetic recording medium of Example 26 was produced with the same film arrangement as that of Example 1 except that the first magnetic layer 122 was formed of CoPt—$TiO_2$—$SiO_2$ (Co: 69 atomic %, Pt: 19 atomic %, $TiO_2$: 9 atomic %, $SiO_2$: 3 atomic %).

(Evaluation)

The perpendicular magnetic recording media of the above Examples and Comparative Examples were evaluated in the following manner. The saturation magnetization (Ms) of magnetic characteristics was evaluated with a vibrating-sample magnetometer (VSM) having a maximum application magnetic field of 15 kOe, Samples for VSM measurement were produced with a structure including a substrate (disk substrate) 110, an adhesive layer 112, an orientation control layer 116, an underlayer 118, an onset layer 120, and a medium protective layer 128. The crystal magnetic anisotropy (Ku) was evaluated with a torque magnetometer having an application magnetic field of 25 kOe. In FIG. 2C, Ms and Ku represent the evaluation results regarding the second magnetic layer.

Furthermore, the magnetic coercive force (Hc) and the index of thermal fluctuation (vKu/kT) were evaluated with a polar Kerr effect measurement apparatus having a maximum application magnetic field of 20 kOe. Moreover, the recording and reproducing characteristics were evaluated at a recording density of 1550 kfci with an RAN analyzer and a perpendicular magnetic recording type magnetic head having an SPT element for recording and a CMR element for reproducing. At that time, the flying height of the magnetic head was 10 nm.

FIGS. 2A-2C show the materials of the first magnetic layer and the second magnetic layer in the perpendicular magnetic recording media of Examples 1-24 and Comparative Examples 1-2 and the evaluation results of Examples 1-24 and Comparative Examples 1-2.

As can be seen from FIGS. 2A-2C, according to a perpendicular magnetic recording medium of the present invention, the second magnetic layer or the first magnetic layer includes CoPt magnetic grains containing oxide so as to eliminate Cr components but to increase the amount of oxide. Therefore, Ku of the entire recording layer can be improved so as to prevent a thermal fluctuation phenomenon. Furthermore, when the CoPt magnetic grains containing oxide is used for the second magnetic layer or the first magnetic layer, the film thickness of the magnetic layer can be reduced, making it possible to improve the recording and reproducing characteristics and to reduce the cost. As a result, improvement of the recording and reproducing characteristics of a perpendicular magnetic recording medium and prevention of a thermal fluctuation phenomenon can be achieved at low cost.

In other words, according to the present invention, electromagnetic characteristics can be improved without deterioration of magnetic characteristics or thermal stability. Thus, a perpendicular magnetic recording medium according to the present invention can cope with further increase of the recording density.

Various exemplary embodiments of this invention will be enumerated in the following items (1)-(5).

(1) A perpendicular magnetic recording medium used for information recording of a perpendicular magnetic recording type, the perpendicular magnetic recording medium comprising:

a substrate;

a soft magnetic layer;

an underlayer formed; and a magnetic layer having a multilayered structure including a plurality of magnetic layers, at least one of the magnetic layers including CoPt magnetic grains containing oxide, the soft magnetic layer, the underlayer, and the magnetic layer being formed on the substrate, (2) The perpendicular magnetic recording medium according to item (1), wherein the oxide comprises at least one material selected from the group consisting of $SiO_2$, $TiO_2$, $Cr_2O_3$, $Ta_2O_5$, $WO_3$, CoO, and $Co_3O_4$.

(3) The perpendicular magnetic recording medium according to item (1) or (2), wherein an oxide content of the CoPt magnetic grains included in the at least one of the magnetic layers is in a range of from 8 atomic % to 15 atomic %.

(4) The perpendicular magnetic recording medium according to one of items (1)-(3), wherein the magnetic layer includes two magnetic layers of an upper magnetic layer and a lower magnetic layer, and the upper magnetic layer or the lower magnetic layer includes CoCrPt magnetic grains containing oxide.

(5) The perpendicular magnetic recording medium according to one of items (1)-(4), wherein the underlayer is formed of a material containing Ru or Ru alloy as a principle component.

In the perpendicular magnetic recording medium of each of the items 1-5, the magnetic layer includes CoPt magnetic grains containing oxide so as to eliminate Cr components but to increase the amount of oxide. Therefore, Ku of the entire recording layer can be improved so as to prevent a thermal fluctuation phenomenon. Furthermore, when such a material is used for a magnetic layer, the film thickness of the magnetic layer can be reduced, making it possible to improve the recording and reproducing characteristics and to reduce the cost. As a result, improvement of the recording and reproducing characteristics of a perpendicular magnetic recording medium and prevention of a thermal fluctuation phenomenon can be achieved at low cost.

Accordingly, electromagnetic characteristics can be improved without deterioration of magnetic characteristics or thermal stability. Thus, a perpendicular magnetic recording medium according to the present invention can cope with further increase of the recording density.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A perpendicular magnetic recording medium used for information recording of a perpendicular magnetic recording type, the perpendicular magnetic recording medium comprising:

a substrate;

a soft magnetic layer;

an underlayer formed; and a magnetic layer having a multilayered structure including a plurality of magnetic layers, at least one of the magnetic layers including CoPt magnetic grains containing oxide, the soft magnetic layer, the underlayer, and the magnetic layer being formed on the substrate, wherein the magnetic layer includes two magnetic layers of an upper magnetic layer and a lower magnetic layer, the upper magnetic layer being on the lower magnetic layer, the upper magnetic layer including CoPt magnetic grains containing oxide and no CoCrPt magnetic grains, and the lower magnetic layer including CoCrPt magnetic grains containing oxide, wherein:

the oxide comprises at least one material selected from the group consisting of $SiO_2$, $Ti_2$, $Cr_2O_3$, $Ta_2O_5$, $WO_3$, CoO, and $Co_3O_4$;

an oxide content of the CoPt magnetic grains included in the at least one of the magnetic layers is in a range of from 8 atomic % to 15 atomic %; and the upper magnetic layer has a film thickness of 3 to 10 nm.

2. The perpendicular magnetic recording medium according to claim 1, wherein the underlayer is formed of a material containing Ru or Ru alloy as a principle component.

* * * * *